//]: #

United States Patent [19]

Gatewood

[11] 4,068,750
[45] Jan. 17, 1978

[54] AUTOMATIC ADJUSTER FOR CLUTCH LINKAGES

[75] Inventor: Sidney Ulane Gatewood, Roseville, Mich.

[73] Assignee: Borg-Warner Corporation, Chicago, Ill.

[21] Appl. No.: 753,328

[22] Filed: Dec. 22, 1976

[51] Int. Cl.² .............................................. F16D 13/75
[52] U.S. Cl. ................................. 192/111 A; 403/368
[58] Field of Search .................... 192/111 A, 70.25; 403/368

[56] References Cited

U.S. PATENT DOCUMENTS

| 1,968,274 | 7/1934 | Wemp | 192/111 A |
| 2,421,869 | 6/1947 | Brock | 192/111 A X |
| 3,433,341 | 3/1969 | Bohn et al. | 192/111 A |
| 3,621,959 | 11/1971 | Gale | 192/111 A |
| 3,768,612 | 10/1973 | Gale | 192/111 A |

FOREIGN PATENT DOCUMENTS 297,339  9/1928  United Kingdom ............ 192/111 A

Primary Examiner—Benjamin W. Wyche
Attorney, Agent, or Firm—James A. Geppert

[57] ABSTRACT

An automatic adjuster mechanism for the clutch linkage between the vehicle clutch pedal and the clutch release fork which maintains the tension and adjustment required in a clutch linkage system to compensate for lining wear of the clutch disc. The adjustment mechanism is located in the clutch pedal to cooperate with a stop bracket mounted in the vehicle and utilizes a one-way clutch engaging the clutch linkage cable upon the clutch release stroke and disengaging on the clutch engagement stroke to allow adjustment of the cable relative to the mechanism.

17 Claims, 7 Drawing Figures

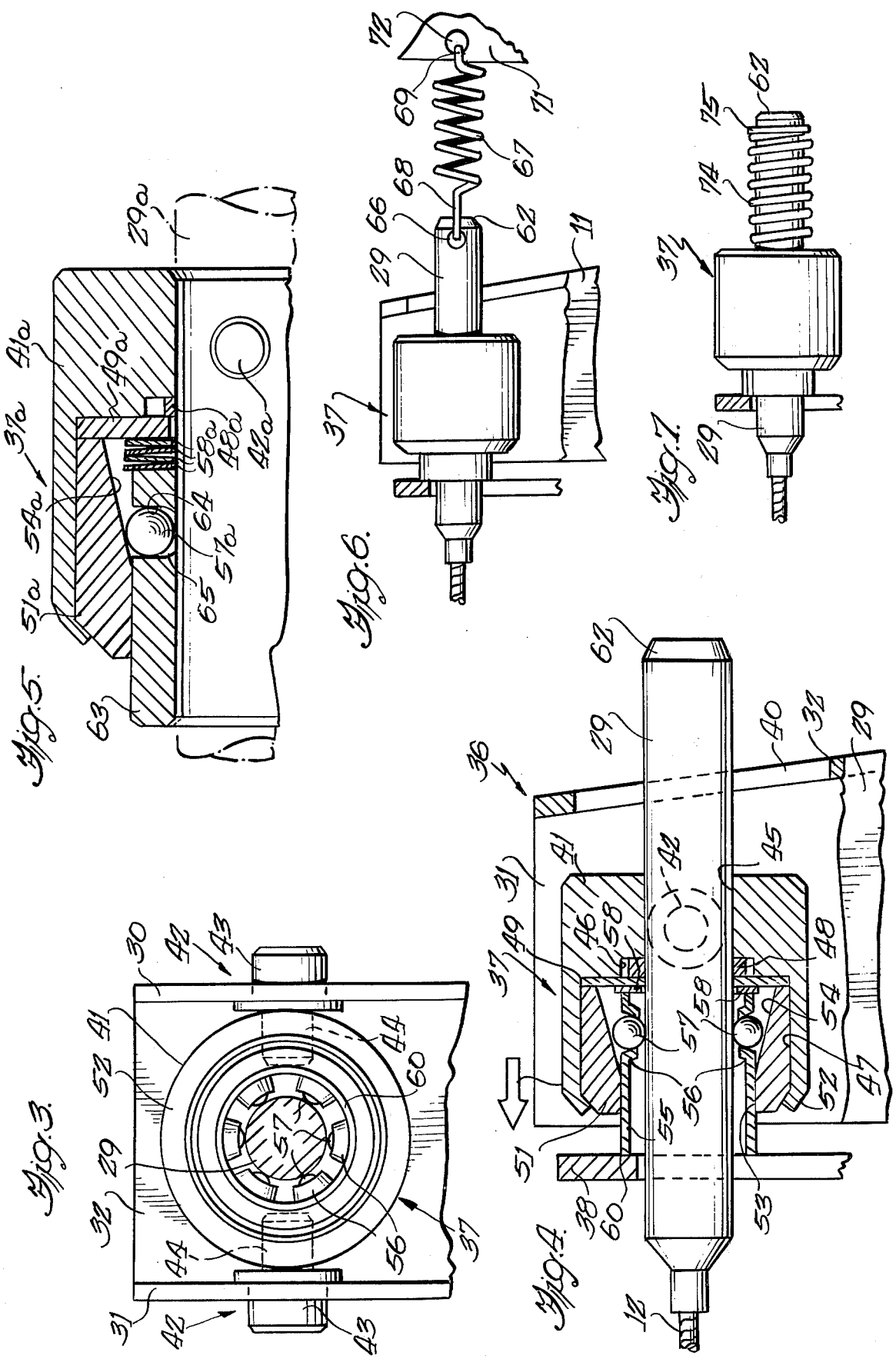

AUTOMATIC ADJUSTER FOR CLUTCH LINKAGES

BACKGROUND OF THE INVENTION

A widely used form of clutch release mechanism employs a clutch release fork pivotally mounted in the housing enclosing the clutch assembly of a vehicle and connected to the clutch pedal in the passenger's compartment of the vehicle by a cable. The release lever actuates a release bearing which acts directly on inwardly extending fingers of a diaphragm spring or on clutch release levers in a coil spring clutch. The clutch release mechanism maintains a light pressure on the release bearing when the clutch is engaged so that the bearing is in constant engagement with the diaphragm spring fingers or the clutch release levers.

During use of the vehicle over an extended period of time, the friction surfaces of the clutch disc will gradually wear so that the clutch pressure plate must travel farther toward the flywheel to fully engage the clutch. In turn, the spring fingers or release levers urge the release bearing farther away from the clutch disc and causes the cable to urge the clutch pedal to a more extended position. Various self-adjusting mechanisms have been proposed to compensate for clutch lining wear, but their construction and/or effectiveness have not been satisfactory. The present invention obviates these problems in providing a simplified and effective automatic adjustment mechanism.

SUMMARY OF THE INVENTION

The present invention comprehends the provision of a self-contained automatic adjustment mechanism for a clutch release linkage which is mounted in the clutch pedal within the vehicle passenger compartment and is operatively connected to a cable linking the clutch pedal with the clutch release fork in the housing enclosing the vehicle clutch assembly. The adjustment mechanism provides a one-way clutch adapted to engage the cable throughout substantially the entire clutch release or engagement stroke but will be released when the clutch is fully engaged.

The present invention also comprehends the provision of an automatic adjustment mechanism for the clutch linkage that requires no adjustment upon its initial assembly in the clutch assembly and requires no maintenance during use.

The present invention further comprehends the provision of an automatic adjustment mechanism for the clutch linkage of a vehicle clutch that provides an infinite wear adjustment for the clutch and maintains a continuous bearing to release lever preload.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 3 is an end elevational view of the adjustment mechanism taken on the line 3—3 of FIG. 2.

FIG. 4 is an enlarged cross sectional view similar to FIG. 2, but showing the adjusting mechanism in its disengaged condition.

FIG. 5 is an enlarged partial cross sectional view of an alternate form of adjustment mechanism.

FIG. 6 is a side elevational view of a third form of adjustment mechanism.

FIG. 7 is a side elevational view of a fourth form of adjustment mechanism.

DESCRIPTION OF THE PREFERRED EMBODIMENTS

Figure 1:
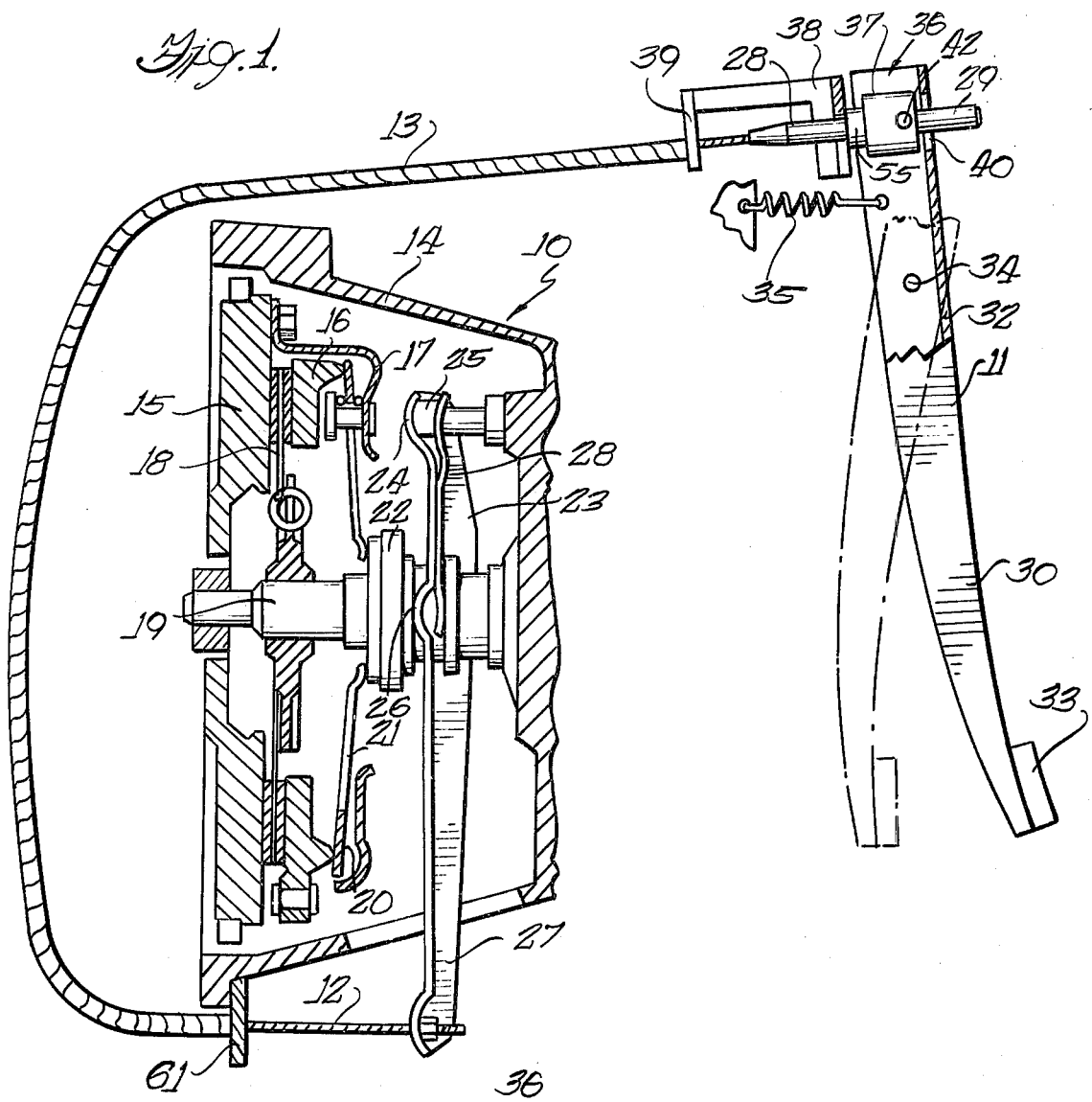
FIG. 1 is a schematic showing of a vehicle clutch assembly and actuating mechanism with portions of the clutch assembly and clutch pedal shown in cross section.

Referring more particularly to the disclosure in the drawings wherein are shown the preferred embodiments of the present invention, FIG. 1 discloses a vehicle clutch assembly 10 actuated by a clutch pedal arm 11 in the passenger compartment of the vehicle through an actuator or cable 12 encased in a flexible sheath 13. The clutch assembly 10 includes a housing 14 adapted to be secured to the vehicle engine (not shown), a flywheel 15 driven by the engine shaft, a generally annular pressure plate 16 and a cover 17 secured to the flywheel, a clutch disc 18 splined onto a driven shaft 19, and a diaphragm or Belleville spring 20 acting to urge the pressure plate 16 towards the clutch disc and having inwardly extending fingers 21.

A release bearing 22 is axially movable relative to the driven shaft to engage the spring fingers 21 and a clutch release fork 23 is operatively connected to the release bearing 22. The release fork has a depression at one end 24 engaging a ball stud 25 secured in the clutch housing 14, a bifurcated central portion 26 operatively connected to the release bearing 22 and a lower end 27 depending from the housing and having the cable 12 secured thereto. A retainer spring 28 is positioned in the fork in a known manner. The opposite end of the cable or actuator terminates in an elongated portion or enlarged cable shaft 29.

The clutch pedal arm 11 includes an elongated channel shaped member having side flanges 30, 31 joined by a web 32, with a pedal pad 33 suitably secured to the lower end. A pivot pin 34 extends through the flanges 30, 31 at an intermediate location and is mounted in the vehicle body to provide a pivotal mounting for the arm and a pedal return spring 35 is connected to the pedal arm above the pin 34 and to the vehicle body to yieldably urge the pedal arm to the clutch engaged position shown in full lines in FIG. 1. Mounted adjacent the upper end 36 of the pedal arm is an automatic adjustment mechanism 37, and a stop bracket 38 is mounted on the vehicle body opposite the adjustment mechanism and has a bracket arm 39 securing the upper end of the sheath 13.

The automatic adjuster 37 and the bracket receive the cable shaft 29 extending therethrough, and the web 32 has a slot 40 therein receiving the cable shaft 29. The adjuster includes a collar 41 pivotally mounted in the pedal 11 by a pair of pivot members 42 having enlarged ends 43 received in the flanges 30, 31 and reduced ends 44 projecting into the collar. The collar is provided with a central passage 45 slidably receiving the cable shaft 29; the passage being counterbored at 46 and then opening into an enlarged recess 47 in the collar end 52 adjacent the stop bracket 38. A snap ring 48 is received in counterbore 46 and frictionally engages the cable shaft 29 for a purpose to be later described.

A stop washer 49 abuts the inner end of the recess 47 and is retained therein by an insert 51 held in the recess by crimping the outer end 52 of the collar. The insert is provided with a central passage having a cylindrical portion 53 and a diverging conical portion 54 extending over approximately the inner two-thirds of the passage. Received in the passage is a generally cylindrical ball retainer or cage 55 having a plurality of circumferentially spaced inwardly flared openings 56 to retain a plurality of balls 57 adapted to be wedged between the conical portion 54 and the outer surface of the cable shaft 29 extending through the passage and cage 55. An annular spring 58, such as a wavy ring or Belleville spring, is positioned between the inner end 59 of the cage 55 and the stop washer 49 to urge the cage toward the stop bracket 38. The outer edge 60 of the cage extends beyond the collar 41 towards and is adapted to be engaged by the bracket 38. The collar 41, insert 51, balls 57, spring 58, and retainer 55 comprise a gripping means operable to grip cable shaft 29.

FIGS. 1 and 4 disclose the adjuster mechanism 37 and the clutch assembly 10 in the clutch engaged position with the front edge 60 of the cage 55 engaging the stop bracket 38 and the rear edge 59 engaging the then flattened annular spring 58; the balls 57 in the cage 55 being disengaged from the conical surface 54 and the exterior surface of the cable shaft 29.

The snap ring 48 constantly engages the cable shaft 29 to provide a frictional drag thereon. Also, a predetermined drag load on the snap ring is proportional to the load required to keep a slight preload between the release bearing 22 and the finger tips of the fingers or levers 21 when the clutch is engaged. Without this preload, the cable may develop slack requiring excess pedal travel to release the clutch.

As the vehicle operator initiates movement of the pedal pad 33 to rotate the pedal arm 11 in a clockwise direction around the pivot pin 34, the collar 41 and related parts move away from the stop bracket 38 allowing the annular spring 58 to bias the cage 55 toward the bracket 38 relative to the collar 41 and the insert 51. In this position shown in FIG. 2, the cage 55 has moved relative to the collar and insert sufficiently to allow the balls to engage and wedge between the conical surface 54 and the exterior surface of the cable shaft 29 so that the adjuster 37 is locked up. During any further rotation of the pedal arm 11, the adjuster moves the cable 12 within the sheath 13 to rotate the release fork 23 in the clockwise direction around the ball stud 25 resulting in a leftward movement of the release bearing 22 to disengage the clutch disc. During rotation of the pedal arm 11, the adjuster mechanism 37 pivots on the members 42 so as to retain the cable 12 and the cable shaft 29 in a straight line. A bracket 61 is located on the clutch housing 14 to engage the lower end of the sheath 13 and prevent movement thereof.

If no wear has occurred and the clutch 10 is reengaged by movement of the pedal arm 11 from the dotted line position to the full line position of FIG. 1, the adjuster 37 will remain in its locked up condition until the edge 60 of the cage 55 contacts the stop bracket 38. As the operator's foot is removed from the pad 33, the pedal return spring 35 will rotate the pedal arm 11 counterclockwise causing the collar 41 and insert 51 to override the ball cage 55 and collapse the annular spring 58, thereby releasing the balls 57. Since no wear has occurred, there will be no change in the position of the cable shaft 29 in relation to the balls 57, collar 41 and insert 51.

However, if facing wear has occurred on the clutch disc 18, when the spring fingers 21 urge the release bearing 22 to a position re-engaging the clutch, the movement of the fingers and the release bearing to the right, as seen in FIG. 1, must be greater causing a greater arc of rotation of the release fork 23. This in turn causes the cable shaft 29 to be pulled to the left when the cage 55 engages the stop bracket 38 to release the balls 57, restricted only by the frictional drag on the cable shaft 29 by the snap ring 48. The pedal return spring 35 is also acting on the pedal arm so that, as adjustment of the cable shaft 29 relative to the collar 41 and insert 51 is effected, the clutch reaches full engagement with the collar and insert moving relative to the ball cage so that the annular spring 58 collapses allowing the stop washer 49 to act as the final pedal stop (FIG. 4).

With the adjustment mechanism 37 assembled to the pedal arm 11 through the pivot members 42 as shown, the cable shaft 29 can be easily assembled by inserting the tapered end 62 through the left-hand end of the adjuster 37 until all cable slack is removed and resistance of the snap ring 48 automatically provides the required bearing preload to the tips of the spring fingers 21. No further adjustment is required in the cable or pedal system.

FIG. 5 discloses an alternate embodiment of ball retainer or cage 63. Similar parts will receive the same reference numeral with the addition of a script *a*. The adjuster mechanism 37*a* includes a collar 41*a* having openings adapted to receive the inner ends of the pivot members 42*a*, a snap ring 48*a* to provide frictional drag on the cable shaft 29*a*, a stop washer 49*a*, an insert 51*a* and a plurality of annular springs 58*a*. The cage 63 has a substantially greater thickness than the cage 55, the thickness being slightly less than the diameter of the balls 57*a*. The cage has a plurality of circumferentially spaced openings 64 to receive the balls 57*a*, the inner ends of the openings adjacent the cable shaft 29*a* being of a reduced diameter to provide a tapered lip 65 retaining the balls within the cage but allowing engagement and wedging action of the balls on the conical surface 54*a* and the exterior surface of the cable shaft 29*a*. Obviously, this embodiment operates in the same manner as the previously decribed mechanism.

Figure 2:
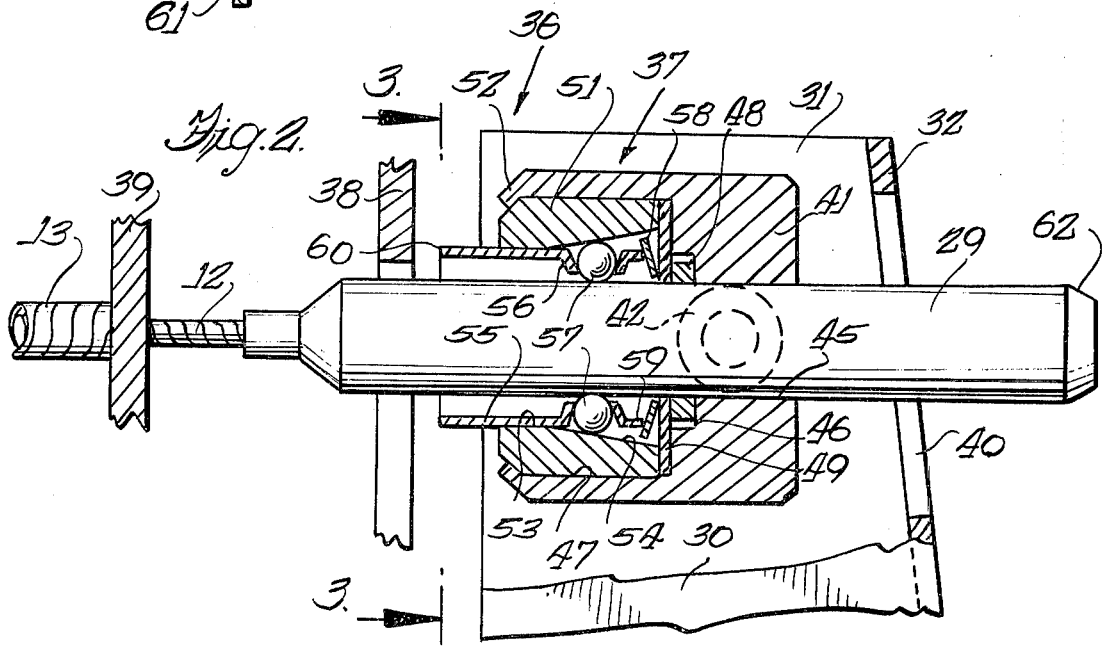
FIG. 2 is an enlarged cross sectional view of the adjusting mechanism in its engaged condition.

FIG. 6 discloses an alternate means to provide the preload on the cable shaft 29 which can be utilized with the mechanism 37 of FIG. 2 or 37*a* of FIG. 5. In this structure, the cable shaft 29 has an opening 66 adjacent the tapered end 62 to receive one end 68 of an extension spring 67, the opposite end 69 of the spring being attached in an opening 72 in a bracket 71 under the dashboard of the vehicle. Where the spring 67 is utilized, the snap ring 48 or 48*a* and stop washer 49 or 49*a* are omitted. This embodiment will operate in the same manner as the previous embodiments, except that the spring 67 causes a slightly greater load on the clutch fingers which increases in proportion to the rate of the spring as wear occurs and which is reduced when the pedal arm 11 is rotated clockwise to disengage the clutch.

FIG. 7 discloses a further alternate and desirable means of providing tension in the cable and maintaining a light load on the bearing engaging the clutch fingers when the clutch is engaged. This means comprises a low rate compression spring 74 positioned on the cable shaft 29 between the mechanism 37 and a retainer ring 75 received in a groove adjacent the tapered end 62 of the cable shaft. In utilizing the low load, low rate spring between the mechanism 37 and retainer ring 75, the increase in load on the clutch fingers as wear occurs is minimized. The spring has the same basic effect on adjustment of the cable shaft 29 relative to the mechanism 37 as the spring 67 of FIG. 6. Obviously, this spring arrangement could be used with the cable shaft 29a and mechanism 37a of FIG. 5 and also eliminates the use of parts 48 or 48a and 49 or 49a.

The balls 57 or 57a in the adjuster mechanism provide an infinite wear adjustment over the life of the clutch, and the surface 54 or 54a in the insert and the exterior surface of the cable shaft 29 or 29a are preferably hardened contact surfaces. Although the clutch assembly 10 is shown with a diaphragm spring 20 providing actuation of the pressure plate 16, it is obvious that the present adjuster mechanism is equally adapted to use with a clutch having clutch release levers and coil springs biasing the pressure plate against the clutch disc.

I claim:

1. A self-adjusting actuating mechanism comprising a pivotally mounted arm, stop means adapted to limit movement of said arm at a first position, spring means urging said arm to the first position, a flexible cable connecting said mechanism with a device to be actuated and terminating at one end in an elongated shaft portion, and gripping means positioned in said arm receiving said elongated shaft portion and including a collar pivotally mounted in said arm and having an internal conical surface, a generally cylindrical ball retainer substantially completely received and axially reciprocable in said collar and receiving said elongated shaft portion therein, a plurality of balls in said retainer and adapted to wedge against said conical surface and the elongated shaft portion, biasing means within said collar urging said ball retainer and balls to their wedging position, said ball retainer extending beyond said collar towards said stop means, and means acting to exert a preload force on said cable and elongated shaft portion.

2. A self-adjusting actuating mechanism as set forth in claim 1, in which said preload means comprises a snap ring mounted in said collar engaging said elongated shaft portion to exert a frictional drag thereon.

3. A self-adjusting actuating mechanism as set forth in claim 1, in which said preload means comprises a spring secured to an end of said actuator shaft portion to bias the actuator in the direction of arm movement away from the first position.

4. A self-adjusting actuating mechanism as set forth in claim 1, in which said preload means comprises a compression spring mounted onto said shaft portion between said collar and a retainer ring on the free end of said shaft portion.

5. A self-adjusting actuating mechanism as set forth in claim 1, in which said biasing means comprises at least one annular spring within said collar and engaging said ball retainer.

6. A self-adjusting actuating mechanism as set forth in claim 5, including a stop washer within said collar and providing an abutting surface for the annular spring.

7. A self-adjusting actuating mechanism as set forth in claim 1, in which said collar has an axial passage therethrough receiving said elongated shaft portion and an enlarged recess facing said stop means, an insert received in said recess and having a passage with a conical surface diverging away from said stop means, said ball retainer received in said passage and having circumferentially space openings receiving said balls located in the space defined by said conical surface, said ball retainer extending beyond said collar and insert towards said stop means, a stop washer in said recess and retained by said insert, at least one annular spring in said recess between said stop washer and said ball retainer, and means exerting a preload force on said actuator.

8. A self-adjusting mechanism comprising a pivotally mounted arm, stop means adapted to limit movement of said arm at a first position, spring means urging said arm to the first position, an actuator having an elongated shaft portion, and gripping means positioned in said arm and receiving said elongated shaft portion, said gripping means including a collar pivotally mounted in said arm and having an internal conical surface, a ball retainer axially reciprocable in said collar and receiving said elongated shaft portion therein, a plurality of balls in said retainer and adapted to wedge against said conical surface and the elongated shaft portion of said actuator, and means acting to exert a preload force on said actuator comprising a snap ring in said collar engaging said elongated shaft portion to exert a frictional drag thereon.

9. A self-adjusting actuating mechanism comprising a pivotally mounted arm, stop means adapted to limit movement of said arm at a first position, spring means urging said arm to the first position, an actuator having an elongated shaft portion, and gripping means positioned in said arm and receiving said elongated shaft portion, said gripping means including a collar pivotally mounted in said arm and having an axial passage therethrough receiving said elongated shaft portion and an enlarged recess facing said stop means, an insert received in said recess and having a passage with a conical surface diverging away from said stop means, a ball retainer axially reciprocable within said last mentioned passage and receiving said elongated shaft portion therein, said ball retainer having circumferentially spaced openings located in the space defined by the conical surface, a plurality of balls received in said openings, said ball retainer extending beyond said collar and insert towards said stop means, a stop washer in said recess and retained by said insert, at least one annular spring in said recess between said stop washer and said ball retainer, and means exerting a preload force on said actuator, said stop means comprising a stationary bracket engaging said ball retainer to move the ball retainer axially inwardly and collapse the annular spring to unlock the gripping means, and movement of said arm from said first position to a second position allows the annular spring to move said ball retainer axially relative to said collar and insert so that the balls are wedged between the conical surface and the exterior surface of said elongated shaft portion to lock up the gripping means.

10. A self-adjusting actuating mechanism as set forth in claim 9, in which adjustment of said actuator relative to said gripping means occurs during return of said arm to its first position when contact of the ball retainer with said stop means causes the balls to disengage from the wedging action.

11. A self-adjusting actuating mechanism as set forth in claim 10, in which said preload means comprises a snap ring in said collar engaging said actuator shaft portion to exert a frictional drag thereon.

12. A self-adjusting actuating mechanism as set forth in claim 10, in which said preload means comprises a spring extending between a stationary member and the free end of said actuator shaft portion and biasing said actuator in the same direction of movement as when said arm moves from said first position towards said second position.

13. A self-adjusting actuating mechanism as set forth in claim 10, in which said preload means comprises a compression spring encompassing said actuator shaft portion and positioned between said collar and a retainer ring on the free end of said shaft portion.

14. A clutch release mechanism comprising a pivotally mounted clutch pedal arm moveable between a clutch released position and a clutch engaged position, a flexible cable operatively connecting said clutch pedal arm to a clutch release bearing, said flexible cable having a shaft portion terminating at the clutch pedal end, gripping means for said cable shaft portion pivotally mounted in said clutch pedal arm, said gripping means including a collar slidably engaging said cable shaft portion and having an interior conical surface, a ball retainer substantially completely housed and axially reciprocable in and extending beyond said collar and encompassing said cable shaft portion, a plurality of balls in said ball retainer and adapted to be wedged between said conical surface and said cable shaft portion to lock up the gripping means, a diaphragm spring in said collar biasing said ball retainer outwardly to result in the wedging action, a stop bracket adapted to be engaged by the exposed end of the ball retainer when said clutch pedal arm is in the clutch engaged position, and means exerting a preload force on said cable shaft portion, said ball retainer acting to move relative to said collar and collapse said diaphragm spring when the retainer abuts the stop bracket to unlock the gripping means and allow adjustment of the cable shaft portion relative to the collar.

15. A clutch release mechanism as set forth in claim 14, in which said preload means comprises a spring secured at one end to the end of the cable shaft portion opposite the stop bracket and at the opposite end to a stationary support.

16. A clutch release mechanism as set forth in claim 14, in which said preload means comprises a compression spring having one end abutting said collar and the other end abutting a retainer attached adjacent to the end of the shaft portion opposite the stop bracket.

17. A clutch release mechanism comprising a pivotally mounted clutch pedal arm moveable between a clutch released position and a clutch engaged position, a flexible cable operatively connecting said clutch pedal arm to a clutch release bearing, said flexible cable having a shaft portion terminating at the clutch pedal end, gripping means for said cable shaft portion pivotally mounted in said clutch pedal arm, said gripping means including a collar slidably engaging said cable shaft portion and having an interior conical surface, a ball retainer axially reciprocable in said collar and encompassing said cable shaft portion, a plurality of balls in said ball retainer and adapted to be wedged between said conical surface and said cable shaft portion to lock up the gripping means, a diaphragm spring in said collar biasing said ball retainer outwardly to result in the wedging action, a stop bracket adapted to be engaged by the exposed end of the ball retainer when said clutch pedal arm is in the clutch engaged position, and means exerting a preload force on said cable shaft comprising a snap ring in said collar engaging said cable shaft portion to exert a frictional drag thereon.

* * * * *